United States Patent [19]

Link

[11] Patent Number: 4,579,203

[45] Date of Patent: Apr. 1, 1986

[54] DRIVE UNIT

[75] Inventor: Achim Link, Schweinfurt, Fed. Rep. of Germany

[73] Assignee: Fichtel & Sachs AG, Schweinfurt, Fed. Rep. of Germany

[21] Appl. No.: 519,685

[22] Filed: Aug. 2, 1983

[30] Foreign Application Priority Data

Aug. 4, 1982 [DE] Fed. Rep. of Germany ....... 3229052

[51] Int. Cl.[4] .............................................. F16D 67/02
[52] U.S. Cl. ................... 192/15; 192/18 R; 192/70.25; 192/98; 192/111 A
[58] Field of Search .................. 192/70.25, 111 A, 98, 192/15, 18 R; 188/71.9, 196 V

[56] References Cited

U.S. PATENT DOCUMENTS

| 3,179,217 | 4/1965 | Root ...................................... 192/98 |
| 3,876,049 | 4/1975 | Linn et al. ......................... 192/70.25 |
| 4,109,773 | 8/1978 | Higgerson et al. ............. 192/111 A |
| 4,445,600 | 5/1984 | Schmidt ............................... 192/98 |

FOREIGN PATENT DOCUMENTS 2604946 8/1976 Fed. Rep. of Germany .

*Primary Examiner*—Rodney H. Bonck
*Assistant Examiner*—Alan G. Towner
*Attorney, Agent, or Firm*—Toren, McGeady, Stanger, Goldberg & Kiel

[57] ABSTRACT

In a drive unit for a motor vehicle a brake is provided for braking down the r.p.m. of the input shaft interconnecting the clutch with the gear box. The brake is actuated by an actuating ring serving also for disengaging the clutch. The actuating ring is connected to a diaphragm spring of the clutch release bearing and an axially extending sleeve. If the clutch linings are worn, the clutch engagement position of the diaphragm spring and the actuating ring is shifted in axial direction. In view of compensating for this axial shift, the sleeve is composed of two sleeve members, one of them being connected to the diaphragm spring and the other of them being connected to the actuating ring through the clutch release bearing and both of them being interconnected by thread means. In case the frictional linings of the clutch are worn to a predetermined degree, the two sleeve members defining the sleeve are threaded with respect to each other, so that the axial position of the actuating ring under clutch engagement conditions is restored, whereby the brake action becomes independent of the wear conditions of the clutch.

2 Claims, 2 Drawing Figures

DRIVE UNIT

SUMMARY OF THE INVENTION

The present invention is directed to a drive unit particularly for motor vehicles. In such a drive unit there is provided a clutch assembly having an axis. The clutch assembly comprises a first rotor unit, a second rotor unit and frictional engagement means on said first rotor unit and said second rotor unit. Biasing means are mounted on the first rotor unit for common rotation therewith for effecting engagement of said frictional engagement means. Clutch release means are mounted for common rotation with the first rotor unit. These clutch release means are axially movable between a clutch engagement position and a clutch disengagement position. The clutch engagement position is subject to axial shift in dependency of the wear condition of the frictional engagement means.

The clutch unit is located axially besides a gear box unit which comprises a gear box housing and an input shaft. The input shaft is coaxially with the clutch assembly and connected for common rotation with the second rotor unit.

An annular release force transmitting unit surrounds the input shaft and has an axis substantially coincident with the axis of the clutch assembly. This annular release force transmitting unit comprises a first annular release force transmitting member adjacent the clutch assembly any connected for common axial movement and common rotation with the clutch release means. Moreover, the annular release force transmitting unit comprises a second annular release force transmitting member adjacent said gear box housing. This second annular release force transmitting member is—under normal operational conditions—mounted for common axial movement and common rotation with the first release force transmitting member.

Further the annular release force transmitting unit comprises a clutch release bearing assembly. This clutch release bearing assembly comprises a first bearing member connected for common axial and rotational movement with said second release force transmitting member and a second bearing member. The second bearing member is mounted for common axial movement with the first bearing member and for free rotation with respect to the first bearing member. Moreover, the second bearing member is connected to a nonrotating clutch actuating unit for axial movement along the axis of the clutch assembly.

The drive unit further comprises frictional input shaft braking means for braking down the r.p.m. of the input shaft when the clutch is disengaged. These frictional input shaft braking means comprise a braking disc member mounted for rotation with the input shaft, a braking face stationary with respect to the gear box housing and a brake disc member engagement face on said clutch actuating unit for common axial movement therewith, in view of pressing said braking disc member into braking engagement with said braking face in response to movement of said clutch release means towards said clutch disengagement position or beyond said clutch disengagement position.

Wear compensating means are provided for adjusting the axial distance of the disc member engagement face in response to wear of the frictional engagement means.

Such a drive unit is known from German 'Offenlegungsschrift' No. 2,604,946. The purpose of the wear compensating means is to effect braking down of the input shaft r.p.m. at a certain predetermined axial path of displacement of the actuating unit from its clutch engagement position toward or beyond its clutch disengagement position independently of the respective wear condition of the frictional engagement means.

In the known construction as shown in German 'Offenlegungsschrift' No. 2,604,946 the brake disc member engagement face is provided by a plate member connected to the actuating unit by one-way locking means. This plate member cooperates with a plate member retaining axial movement preventing axial movement of the plate member beyond a predetermined axial location, when the clutch release means return into their clutch engagement position. If due to wear of the frictional engagement means the clutch engagement position of the clutch release means has been shifted in axial direction, the plate member is retained by the plate member retaining member before the clutch release means have achieved their clutch engagement position. Therefore, the plate member is adjusted with respect to the clutch actuating unit, this adjustment being permitted by said one-way locking means.

In the known construction according to German 'Offenlegungsschrift' No. 2,604,946 the first and second release force transmitting members are invariable in their axial adjustment with respect to each other. The one-way locking means are discontinuous locking means defined by a saw-tooth-shaped thread and a thread engagement member. No continuous adjustment is possible. Moreover, shift of the clutch engagement position of the actuating unit is not compensated for when wear of the frictional engagement means occurs. This means that additional compensating means must be provided in the transmission means between the foot pedal and the clutch actuating unit if it is desired to always have a definite position of the foot pedal corresponding to the clutch engagement condition and a definite position of the foot pedal corresponding to the clutch disengagement condition.

It is a primary object of this invention to ensure a continuous adjustment effect of the wear compensating means.

A further object of this invention is to ensure automatic compensation not only for shift of the clutch engagement position of the brake disc member engagement face, but also automatic compensation for shift of the clutch engagement position of the clutch actuating unit, so as to avoid additional compensating means in the transmission between the foot pedal and the clutch actuating unit.

It is a further object of this invention to provide wear compensating means which are of simple and stable construction.

In view of at least one of the above objects and particularly of the main object as defined above, said first release force transmitting member and said second release force transmitting member are interconnected by thread means having an axis substantially coincident with the axis of the clutch assembly and frictional torque supporting means are provided for supporting said second force transmitting member in said clutch engagement position of said clutch release means against rotation with said first release force transmitting member in response to axial shift of said clutch engagement position of said clutch release means.

The basic principle of this invention is applicable to both drive units with pulled-type clutches and to drive units with pressed-type clutches.

The various features of novelty which characterize the invention are pointed out with particularity in the claims annexed to and forming a part of this disclosure. For a better understanding of the invention its operating advantages and specific objects attained by its use, reference should be had to the accompanying drawings and descriptive matter in which there are illustrated and described preferred embodiments of the invention.

DETAIL DESCRIPTION OF THE DRAWING

Figure 1:
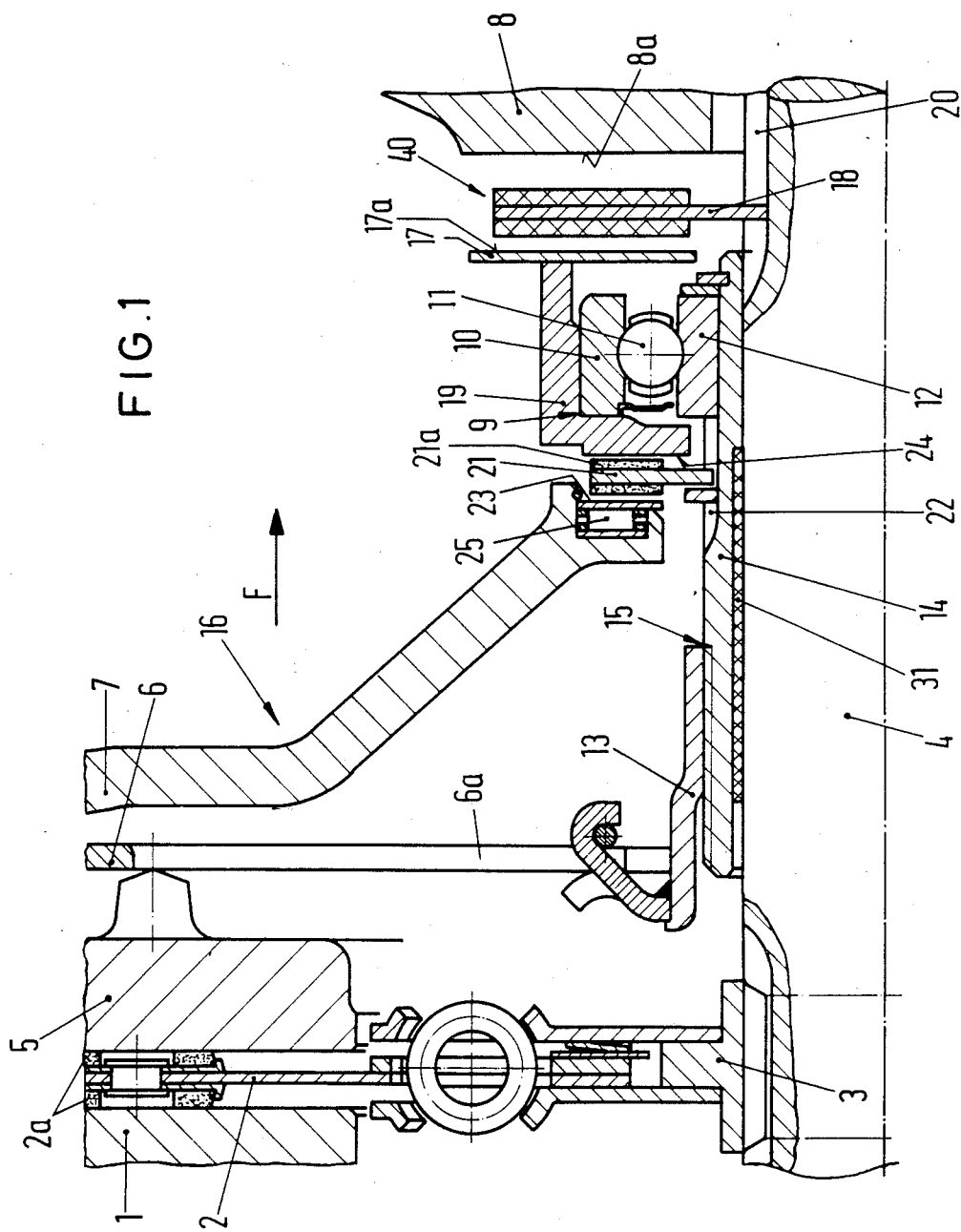
FIG. 1 is a longitudinal section of a first embodiment of the drive unit of this invention incorporating a pulled-type clutch assembly.

In FIG. 1 a clutch assembly is designated by 16. The clutch assembly is a so-called pulled-type clutch assembly. The clutch assembly comprises a driving disc 1 to which a clutch housing 7 is fastened. A pressure plate 5 is as usually positioned axially between the clutch housing 7 and the driving disc 1. A clutch disc 2 is positioned between the pressure plate 5 and the drive disc 1. The clutch disc 2 comprises a hub 3 which is connected to an input shaft 4 of a gear box, so that it is axially movable along said input shaft 4, but rotates with the input shaft. The pressure plate 5 is axially movable with respect to the clutch housing 7 and is connected to the clutch housing 7 for common rotation. A diaphragm spring 6 is supported at the outer circumference of the clutch housing 7 (not shown); a radially intermediate part of the diaphragm spring 6 acts onto the pressure plate 5 so as to engage the clutch disc 2 between the drive disc 1 and the pressure plate 5. The diaphragm spring 6 comprises radially inwardly directed tongues 6a acting as clutch release means.

A clutch release bearing is generally designated by 9. This clutch release bearing comprises a first bearing member 12 and a second non-rotating bearing member 10, said bearing members 12 and 10 being interconnected for common axial movement and for free relative rotation by bearing balls 11. The second bearing member 10 is fastened to a non-rotating clutch actuating ring 19 which is connected to a clutch release fork (not shown). The rotating first bearing member 12 is fixed to a sleeve member 14 which extends towards the clutch assembly 16. The interior surface of the sleeve member 14 is lined with a bushing 31 by which the sleeve member 14 is mounted on the input shaft 4 for free axial movement and free rotation with respect thereto. The sleeve member 14 is connected to a further sleeve member 13 by thread means 15. The sleeve member 13 is fastened for common rotation with the diaphragm disc 6. In view of disengagement of the clutch assembly 5 the clutch actuating ring 19 is moved to the right with respect to the position as shown in FIG. 1. The clutch release force is transmitted from the clutch actuating ring 19 through the clutch release bearing 9 and the sleeve members 14, 13 to the tongues 6a of the diaphragm spring 6. The sleeve members 13 and 14 may be regarded as first and second release force transmitting members, respectively.

Frictional input shaft braking means are generally designated by 40. These braking means comprise a braking disc member 18 which is connected to the input shaft 4 for common rotation by a groove 20 and is axially movable along the input shaft 4. The gear box comprises a gear box housing 8. This gear box housing 8 comprises a braking face 8a. A brake engagement member 17 comprising a brake disc member engagement face 17a is fixed to the clutch actuating ring 19. The brake engagement member 17 urges the braking disc member 18 against the stationary braking face 8a when said clutch actuating ring 19 is moved to the right from the position as shown in FIG. 1 to the normal clutch disengagement position or beyond said normal clutch disengagement position. So a controlled reduction of the r.p.m. of the input shaft 4 is possible.

In view of maintaining the braking effect of the frictional input shaft braking means 40 substantially constant during the lifetime of the clutch assembly 16, wear compensating means are provided which compensate for the wear of the frictional linings 2a of the clutch disc 2.

These wear compensating means comprise the thread means 15 between the sleeve member 14 and the sleeve member 13. Moreover, a support disc member 21 is mounted onto the sleeve member 14 for common rotation with said sleeve member 14 and for axial movement with respect thereto. The support disc member 21 is located axially between a torque supporting face 24 of the clutch actuating ring 19 and an abutment disc 23 mounted on the clutch housing 7 for free rotation with respect thereto by radially disposed roller members 25. The support disc member 21 is provided with friction linings 21a.

The operation of the so-far described drive unit of FIG. 1 is as follows:

In FIG. 1 the clutch assembly 16 is in the engaged condition. No external clutch release force is exerted onto the clutch actuating ring 19 and the clutch release bearing 9. The tongues 6a of the diaphragm spring 6 are in their most leftward position. In view of initiating the disengagement of the clutch assembly the actuating ring 19 is displaced to the right according to the arrow F towards the clutch housing 8. This displacement is transmitted through the clutch release bearing 9, the sleeve member 14, the thread means 15 and the sleeve means 13 onto the tongues 6a of the diaphragm spring 6. The pressure plate 5 becomes free of the axial load exerted by the diaphragm spring 6, so that the clutch disc 2 is not further engaged between the pressure plate 5 and the drive disc 1. The clutch disc 2 can rotate independently of the drive disc 1. In view of certain gear change operations within the gear box 8, it is desirable to brake down the r.p.m. of the input shaft 4 from its original value to a reduced value. This reduction of the r.p.m. is obtained in that the clutch actuating ring 19 is moved in the direction F beyond the position necessary for disengagement of the clutch assembly 16, until the brake engagement member 17 urges the braking disc member 18 into frictional contact with the stationary braking face 8a. The clutch assembly is reengaged by the diaphragm spring 6 when the actuating force acting onto the clutch actuating ring is terminated.

After a certain period of operation the frictional linings 2a of the clutch disc 2 are worn and thereby reduced in thickness, so that the clutch engagement position of the tongues 6a and the members 13, 14, 9, 19 and 17 is shifted to the left. This means that the path of movement of the clutch actuating ring 19 from the clutch engagement condition to the brake engagement condition occurring in the braking means 40 is increased. This would be undesirable, because the braking action would become different during the lifetime of the clutch assembly.

In view of avoiding this undesirable result of wear of the frictional linings 2a, the above mentioned wear compensating means have been provided.

As soon as a predetermined reduction of the thickness of the frictional linings 2a has occurred, the support disc member 21 is engaged between the supporting face 24 of the clutch actuating ring 19 and the abutment disc 23 of the clutch housing 7. So the sleeve member 14 is prevented from rotation with the sleeve member 13, which on the other hand is connected for common rotation with the diaphragm spring 6 and the clutch housing 7. When the braking torque acting onto the support disc member 21 exceeds a predetermined value due to increasing shift of the clutch engagement position of the clutch actuating ring 19 to the left as seen in FIG. 1, the sleeve member 14 is rotated with respect to the sleeve member 13 and the sleeve member 14 is threaded to the right as seen in FIG. 1. So the original position of the clutch actuating ring 19 and the brake engagement member 17 is restored until the torque transmitting engagement of the support disc member 21 and the torque supporting face 24 is terminated. The sense of the thread means 15 between the sleeve members 11 and 13 respectively must be such that on engagement of the support disc member 21 and the torque supporting face 24 the sleeve member 14 is screwed to the right as seen in FIG. 1. Assuming that the clutch assembly 16 rotates in clockwise sense when regarded from the gear box housing 8 against the direction of the arrow F, the thread means 15 must be righthand thread means.

The position of the clutch actuating ring 19 in the clutch engagement condition is continuously restored in spite of reduction in thickness of the frictional linings 2a. Therefore, the clutch disengagement of the foot pedal always obtained within the same range of displacement (not shown) without the necessity of manual or automatic readjustment in the transmission means between the foot pedal and the clutch actuating ring 19.

Figure 2:
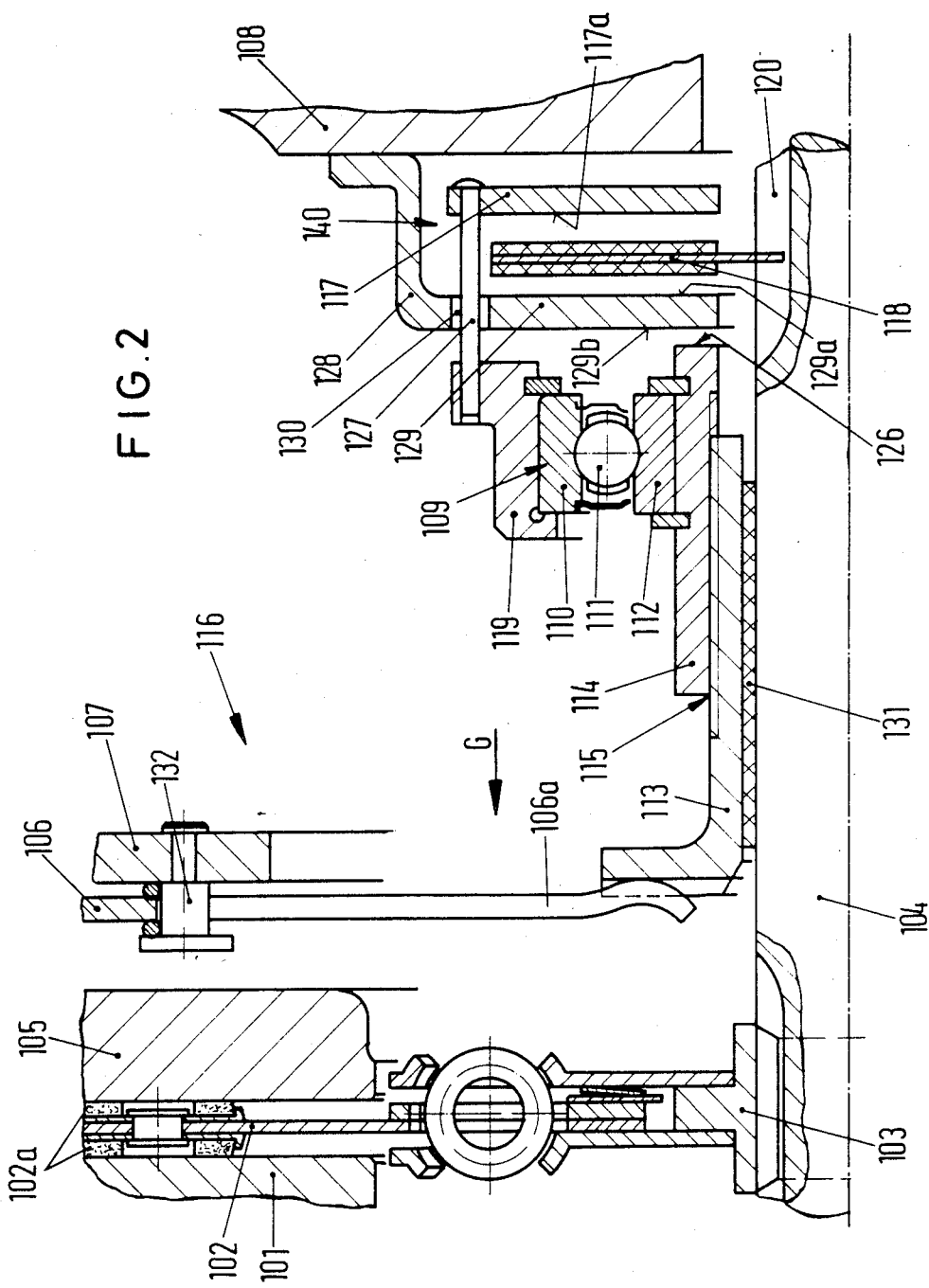
FIG. 2, is a longitudinal section of an embodiment of this invention incorporating a pressed-type clutch assembly.

In the embodiment of FIG. 2 the clutch assembly 116 is a pressed-type clutch assembly, in which for disengagement of the clutch the release bearing 109 is to be moved to the left in the direction of the arrow G. Analogous parts are designated by the same reference numbers as in FIG. 1 increased by 100. The pressure plate 105 is biased to the left by the radially outer portion of the diaphragm spring 106 (not shown), said diaphragm spring 106 being pivotally connected to the clutch housing 107 by rivets 132. If the radially inner ends of the tongues 106a are moved to the left in FIG. 2 the clutch disc 102 becomes free between the pressure plate 105 and the drive disc 101.

The clutch release bearing 109 comprises again the bearing members 110 and 112, the bearing member 110 being fastened to the clutch actuating ring 119 and the bearing member 112 being fastened to the sleeve member 114. The sleeve member 114 is interconnected to a further sleeve member 113 by thread means 115. The sleeve member 113 engages the tongues 106 and is engaged with them for common rotation and common axial movement. The sleeve member 113 is mounted on the input shaft 104 by a bushing 131 for axial movement and free rotation. The input shaft braking means 140 comprises a braking disc member 118 which is axially movable with respect to the input shaft 104 and is connected for common rotation to the input shaft by the groove or grooves 120. A pot-shaped member 128 is fixed to the gear box housing 108. This pot-shaped member 128 comprises a bottom wall 129. The bottom wall 129 defines a braking face 129a. A brake engagement member 117 is connected to the clutch actuating ring 119 by pulling rods 127. The braking disc member 118 is located axially between the braking face 129a and the brake engagement member 117. The pulling rods 127 pass through openings 130.

The clutch assembly 116 is brought into disengaged condition by shifting the tongues 106a to the left through the sleeve members 113, 114, the clutch release bearing 109 and the clutch actuating ring 119. The brake engagement member 117 is moved to the left when the clutch actuating ring 119 is moved to the left. After the tongues 106a have achieved their clutch disengagement position the clutch actuating ring 119 may be further moved to the left until the brake engagement member 117 urges the braking disc member 118 into frictional engagement with the braking disc 129a.

The sleeve member 114 is provided with an end face 126 facing a torque supporting face 129b of the bottom wall 129 of the pot-shaped member 128.

In normal operation the end face 126 contacts the torque supporting face 129b without substantial pressure or even with a small gap therebetween, when the diaphragm spring 106 and the tongues 106a are in their clutch engagement position. The gap as shown in FIG. 2 between the end face 126 and the torque supporting face 129b is exaggerated. If the frictional linings 102a are reduced in thickness due to wear, the clutch engagement position of the tongues 106a and the sleeve member 113 is shifted to the right and the position of the brake engagement member 117 is also shifted to the right. This shift to the right of the brake engagement member 117 is compensated, however, because the end face 126 comes into engagement with the torque supporting face 129b. When a certain contact pressure between the end face 126 and the torque supporting face 129b is exceeded, the sleeve member 114 is inhibited from turning with the sleeve member 113 rotating with the diaphragm spring 106 and the clutch housing 107. So a relative rotation occurs between the sleeve members 114 and 113 with the result that the sleeve member 114 is screwed to the left with respect to the sleeve member 113. So the original clutch engagement position of the clutch actuatinq ring 119 and the brake engagement member 117 is restored in spite of the fact that the tongues 106a have moved to the right as a result of reduction in thickness of the frictional linings 102a. As a result thereof, the path of movement of the actuating ring 119 to the left from the position as shown in FIG. 2, which path is necessary for making the input shaft braking means effective, remains constant even if the frictional linings 102a are reduced in thickness. Moreover, as the clutch actuating ring 119 is continuously readjusted into a predetermined axial position between the clutch housing 107 and the gear box housing 108, as indicated in FIG. 2, the path of movement of the foot pedal necessary for moving the clutch actuating ring 119 from the clutch engagement position, as shown in FIG. 2, into the clutch disengagement position and into the engagement position of the input shaft braking means always extends between fixed positions without an additional compensation being necessary in the transmission means interconnecting the foot pedal and the clutch actuating ring 119.

While specific embodiments of the invention have been shown and described in detail to illustrate the application of the inventive principles, it will be understood that the invention may be embodied otherwise without departing from such principles.

The reference numerals are only for an easier understanding. They are not to be understood in a restrictive sense.

What is claimed is:

1. In a drive unit particularly for motor vehicles comprising
   (a) a clutch assembly (16) having an axis and comprising
      (aa) a first rotor unit (1, 5, 7);
      (ab) a second rotor unit (2, 3);
      (ac) frictional engagement means (2a) on said first rotor unit (1, 5, 7) and said second rotor unit, respectively;
      (ad) biasing means (6) mounted on said first rotor unit (1,5,7) for common rotation therewith and effecting engagement of said frictional engagement means (2a);
      (ae) clutch release means 6a) mounted for common rotation with said first rotor unit (1, 5, 7) and being axially movable between a clutch engagement position (FIG. 1) and a clutch disengagement position, said clutch engagement position being subject to axial shift in dependency on the wear condition of said frictional engagement means (2a);
   (b) a gear box unit comprising
      (ba) a gear box housing (8) and
      (bb) an input shaft (4) having an axis coincident with said axis of said clutch assembly (16) and being connected for common rotation with said second rotor unit (2, 3);
   (c) an annular release force transmission unit (13, 15, 14, 9) surrounding said input shaft (4) and having an axis coincident with the axis of said clutch assembly (16), said annular release force transmitting unit (13, 15, 14, 9) comprising
      (ca) a first annular release force transmitting member (13) adjacent said clutch assembly (16) and engaged for common axial movement and common rotation with said clutch release means (6a),
      (cb) a second annular release force transmitting member (14) adjacent said gear box housing (8) and mounted—under normal operational conditions— for common axial movement and common rotation with said first release force transmitting member (13) and
      (cc) a clutch release bearing assembly (9) comprising
         (cca) a first bearing member (13) connected for common axial and rotational movement with said second release force transmitting member (14) and
         (ccb) a second bearing member (10) mounted for common axial movement with said first bearing member (12) and for free rotation with respect to said first bearing member, said second bearing member (10) being connected to a non-rotating clutch actuating unit (19) for axial movement along said axis of said clutch assembly (16);
   (d) frictional input shaft braking means (40) comprising
      (da) a braking disc member (18) mounted for rotation with said input shaft (4);
      (db) a braking face (8a) stationary with respect to said bear box housing (8);
      (dc) a brake disc member engagement face (17a) mounted on said clutch actuating unit (19) for common axial movement therewith in view of pressing said braking disc member (18) into braking engagement with said braking face (8a) in response to movement of said clutch release means (6a) towards or beyond said clutch disengagement position;
   (e) wear compensating means compensating for the axial shift of said brake disc member engagement face (17a) resulting from wear of said frictional engagement means (2a);

the improvement comprising thread means (15) having an axis coincident with said axis of said clutch assembly (16) and interconnecting said first release force transmitting member (13) and said second release force transmitting member (14), and frictional torque supporting means (21, 24, 23) frictionally supporting said second release force transmitting member (14) in said clutch engagement position of said clutch release means (6a) against rotation with said first release force transmitting member (13) in response to axial shift of said clutch engagement position of said clutch release means (6a), said clutch engagement position of said clutch release means (6a) being more remote from said gear box housing (8) than said clutch disengagement position;

said clutch engagement position of said clutch release means (6a) being shifted axially away from said gear box housing (8) in response to increasing wear of said frictional engagement means (2a);

said braking disc member (18) of said frictional input shaft braking means (40) being located axially between said stationary braking face (8a) directed towards said clutch assembly (16) and said brake disc member engagement face (17a) directed towards said gear box housing (8);

said frictional torque supporting means (21, 24, 23) comprising a support disc member (21) mounted for common rotation with and axial movement with respect to said second release force transmitting member (14) and being located axially between a torque supporting face (24) of said nonrotating clutch actuating unit (19) and an abutment face (23) of said first rotor unit (1, 5, 7), which abutment face (23) is axially fixed with respect to said first rotor unit (1, 5, 7) and mounted for free rotation with respect thereto;

said thread means (15) being of such sense that said second release force transmitting member (14) is threaded towards said gear box housing (8) when said support disc member (21) is engaged by said torque supporting face (24) and said abutment face (23) in response to axial shift of said clutch engagement position of said clutch release means (6a) away from said gear box housing (8).

2. In a drive unit [as set forth in claim 1], particularly for motor vehicles comprising
   (a) a clutch assembly (16) having an axis and comprising
      (aa) a first rotor unit (1, 5, 7);
      (ab) a second rotor unit (2, 3);
      (ac) engagement means (2a) on said first rotor unit (1, 5, 7) and said second rotor unit, respectively;
      (ad) biasing means (6) mounted on said first rotor unit (1, 5, 7) for common rotation therewith and effecting engagement of said frictional engagement means (2a);

(ae) clutch release means (6a) mounted for common rotation with said first rotor unit (1, 5, 7) and being axially movable between a clutch engagement position (FIG. 1) and a clutch disengagement position, said clutch engagement position being subject to axial shift in dependency on the wear condition of said frictional engagement means (2a);

(b) a gear box unit comprising
  (ba) a gear box housing (8) and
  (bb) an input shaft (4) having an axis coincident with said axis of said clutch assembly (16) and being connected for common rotation with said second rotor unit (2, 3);

(c) an annular release force transmitting unit (13, 15, 14, 9) surrounding said input shaft (4) and having an axis coincident with the axis of said clutch assembly (16), said annular release force transmitting unit (13, 15, 14, 9) comprising
  (ca) a first annular release force transmitting member (13) adjacent said clutch assembly (16) and engaged for common axial movement and common rotation with said clutch release means (6a),
  (cb) a second annular release force transmitting member (14) adjacent said gear box housing (8) and mounted—under normal operational conditions— for common axial movement and common rotation with said first release force transmitting member (13) and
  (cc) a clutch release bearing assembly (9) comprising
    (cca) a first bearing member (12) connected for common axial rotational movement with said second release force transmitting member (14) and
    (ccb) a second bearing member (10) mounted for common axial movement with said first bearing member (12) and for free rotation with respect to said first bearing member, said second bearing member (10) being connected to a non-rotating clutch actuating unit (19) for axial movement along said axis of said clutch assembly (16);

(d) frictional input shaft braking means (40) comprising
  (da) a braking disc member (18) mounted for rotation with said input shaft (4);
  (db) a braking face (8a) stationary with respect to said gear box housing (8);
  (dc) a brake disc member engagement face (17a) mounted on said clutch actuating unit (19) for common axial movement therewith in view of pressing said braking disc member (18) into braking engagement with said braking face (8a) in response to movement of said clutch release means (6a) towards or beyond said clutch disengagement position;

(e) wear compensating means compensating for the axial shift of said brake disc member engagement face (17a) resulting from wear of said frictional engagement means (2a);

the improvement comprising thread means (15) having an axis coincident with said axis of said clutch assembly (16) and interconnecting said first release force transmitting member (13) and said second release force transmitting member (14), and frictional torque supporting means (21, 24, 23) frictionally supporting said second release force transmitting member (14) in said clutch engagement position of said clutch release means (6a) against rotation with said first release force transmitting member (13) in response to axial shift of said clutch engagement position of said clutch release means (6a), said clutch engagement position of said clutch release means (106a) being nearer to said gear box housing (108) than said clutch disengagement position;

said clutch engagement position of said clutch release means (106a) being shifted towards said gear box housing (108) in response to increasing wear of said frictional engagement means (102a);

said braking disc member (118) of said frictional input shaft braking means (140) being located axially between said stationary braking face (129a) directed away from said clutch assembly (116) and said brake disc member engagement face (117a) directed away from said gear box housing (108);

said frictional torque supporting means (126, 129b) comprising an end face (126) of said second release force transmitting member (114) directed away from said clutch assembly (116) and a torque supporting face (129b) stationary with respect to said gear box housing (108) and directed towards said clutch assembly (116);

said thread means (115) being of such sense that said second release force transmitting member (114) is screwed away from said gear box housing (108) when said end face (126) engages said torque supporting face (129b) in response to axial shift of said clutch engagement position of said clutch release means (106a) towards said gear box housing (108).

* * * * *